US012600521B2

(12) United States Patent
Sherman et al.

(10) Patent No.: US 12,600,521 B2
(45) **Date of Patent: *Apr. 14, 2026**

(54) RETAIL PACKAGING FOR ANGULAR BRUSH

(71) Applicant: ZIBRA, LLC, Mooresville, NC (US)

(72) Inventors: Michael Milton Sherman, Mooresville, NC (US); William Lane Ball, Statesville, NC (US)

(73) Assignee: ZIBRA, LLC, Mooresville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/885,586

(22) Filed: Sep. 14, 2024

(65) Prior Publication Data

US 2025/0019112 A1 Jan. 16, 2025

Related U.S. Application Data

(60) Continuation of application No. 18/380,599, filed on Oct. 16, 2023, now Pat. No. 12,091,224, which is a division of application No. 17/872,537, filed on Jul. 25, 2022, now Pat. No. 11,787,593, which is a continuation of application No. 16/737,900, filed on Jan. 8, 2020, now Pat. No. 11,396,397.

(60) Provisional application No. 62/789,993, filed on Jan. 8, 2019.

(51) Int. Cl.

*B65D 5/18* (2006.01)
*B44D 3/12* (2006.01)
*B65D 75/14* (2006.01)
*B65D 85/00* (2006.01)

(52) U.S. Cl.

CPC ............... *B65D 5/18* (2013.01); *B44D 3/125* (2013.01); *B65D 75/14* (2013.01); *B65D 85/54* (2013.01); *B65D 2585/54* (2013.01)

(58) Field of Classification Search

CPC .......... B65D 5/18; B65D 75/14; B65D 85/00; B65D 85/54; B65D 2585/54; B44D 3/125
USPC .............................................. 206/361, 362.4
See application file for complete search history.

(56) References Cited

U.S. PATENT DOCUMENTS 11,396,397 B2 * 7/2022 Sherman ................ B65D 85/54
11,787,593 B2 * 10/2023 Sherman ................ B65D 85/54 206/361
12,091,224 B2 * 9/2024 Sherman ............ B65D 73/0078

* cited by examiner

*Primary Examiner* — Jacob K Ackun

(74) *Attorney, Agent, or Firm* — TILLMAN WRIGHT, PLLC; Chad D. Tillman

(57) ABSTRACT

Packaging for protecting a brush comprises a box and a brush. The brush has bristles forming a particular shape, and the box defines a nose with a corresponding shape for accommodating the bristles without bending or impacting the bristles, whereby the brush holds its form while packaged. The brush preferably is an angular brush. The box includes a lid by which the brush is secured, with a handle of the brush extending through an opening in the lid.

12 Claims, 15 Drawing Sheets

RETAIL PACKAGING FOR ANGULAR BRUSH

CROSS-REFERENCE TO RELATED APPLICATION

The present application hereby incorporates by reference U.S. Pat. No. 11,787,593 and 11,396,397, each of which issued from an application from which priority is claimed. Additionally, the present application claims the benefit of U.S. provisional patent application 62/789,993, filed Jan. 8, 2019, incorporated herein by reference, the disclosure of the '993 application being contained in the appendix attached hereto, which also is incorporated herein by reference.

COPYRIGHT STATEMENT

Any new and original work of authorship in this document is subject to copyright protection under the copyright laws of the United States and other countries. Reproduction by anyone of this document as it appears in official governmental records is permitted, but otherwise all other copyright rights whatsoever are reserved.

BACKGROUND OF THE INVENTION

The present invention generally relates to retail packaging and, in particular, to individual retail packaging for a single, angular brush. It is believed that improvement in such packaging is needed, and that a packaging in accordance with one or more aspects and features of the invention represents such an improvement.

SUMMARY OF THE INVENTION

The present invention includes many aspects and features. Moreover, while many aspects and features relate to and are described in the context of angled paintbrushes, the present invention is not limited to such use and may find use with other types of brushes, as will become apparent from the following summaries and detailed descriptions of aspects, features, and one or more embodiments of the present invention.

Accordingly, in an aspect, retail packaging in which a brush is protected comprises: a box, and a brush, wherein the bristles of the brush are contained within the box and a handle of the brush extends outside of the box. Furthermore, the brush has bristles forming a particular shape and the box defines a nose with a corresponding shape for accommodating the bristles without bending or impacting the bristles, whereby the brush holds its form while the bristles are contained and protected in the retail packaging. The brush preferably is an angular brush.

In another aspect, retail packaging for protecting a brush comprises a brush and means for protecting an end of the bristles of the brush such that the brush holds its form while packaged.

In another aspect, packaging for selling a paintbrush comprises: a box, and an angular paintbrush. The angular paintbrush has bristles forming a slanted end and the box defines a nose with a corresponding slanted end.

In a feature, a handle of the paintbrush extends through an opening defined by overlapping recesses in the box.

In another feature, the box comprises a lid that is movable for transitioning the box between a closed disposition and an opened disposition. Preferably, the packaging comprises hook-and-loop fasteners for securing the lid and keeping the box in the closed disposition.

In another aspect, a box for protecting an end of an angular paintbrush comprises: a first component defining a bottom and side walls; and a second component defining a top wall. The first component and the second component are connected at a nose of the box such that the first and second components are movable relative to one another to transition the box between a closed disposition and an opened disposition. Additionally, the nose of the box comprises a slanted end whereby the box is configured to receive therein an end of an angular paintbrush. The first component may comprise a base or housing of the box and the second component may comprise a lid of the box. The lid may be hinged to the base. Furthermore, a living hinge may connect the lid to the base.

In another aspect, packaging for selling a paintbrush at retail comprises an angular paintbrush and means for protecting a slanted end of the bristles of the angular paintbrush such that the brush holds its form while packaged.

In another aspect, a single sheet preferably of cardboard bearing printed graphics defines a blank having fold lines defined therein forming panels, the sheet when folded and adhered forming a box of the foregoing disclosed retailing packaging.

Additional aspects and features are disclosed in the appendix attached hereto and incorporated herein by reference.

In addition to the aforementioned aspects and features of the present invention, it should be noted that the present invention further encompasses the various logical combinations and subcombinations of such aspects and features. Thus, for example, claims in this or a divisional or continuing patent application or applications may be separately directed to any aspect, feature, or embodiment disclosed herein, or combination thereof, without requiring any other aspect, feature, or embodiment.

BRIEF DESCRIPTION OF THE DRAWINGS

One or more preferred embodiments of the present invention now will be described in detail with reference to the accompanying drawings, wherein the same elements are referred to with the same reference numerals.

DETAILED DESCRIPTION

Figure 1:
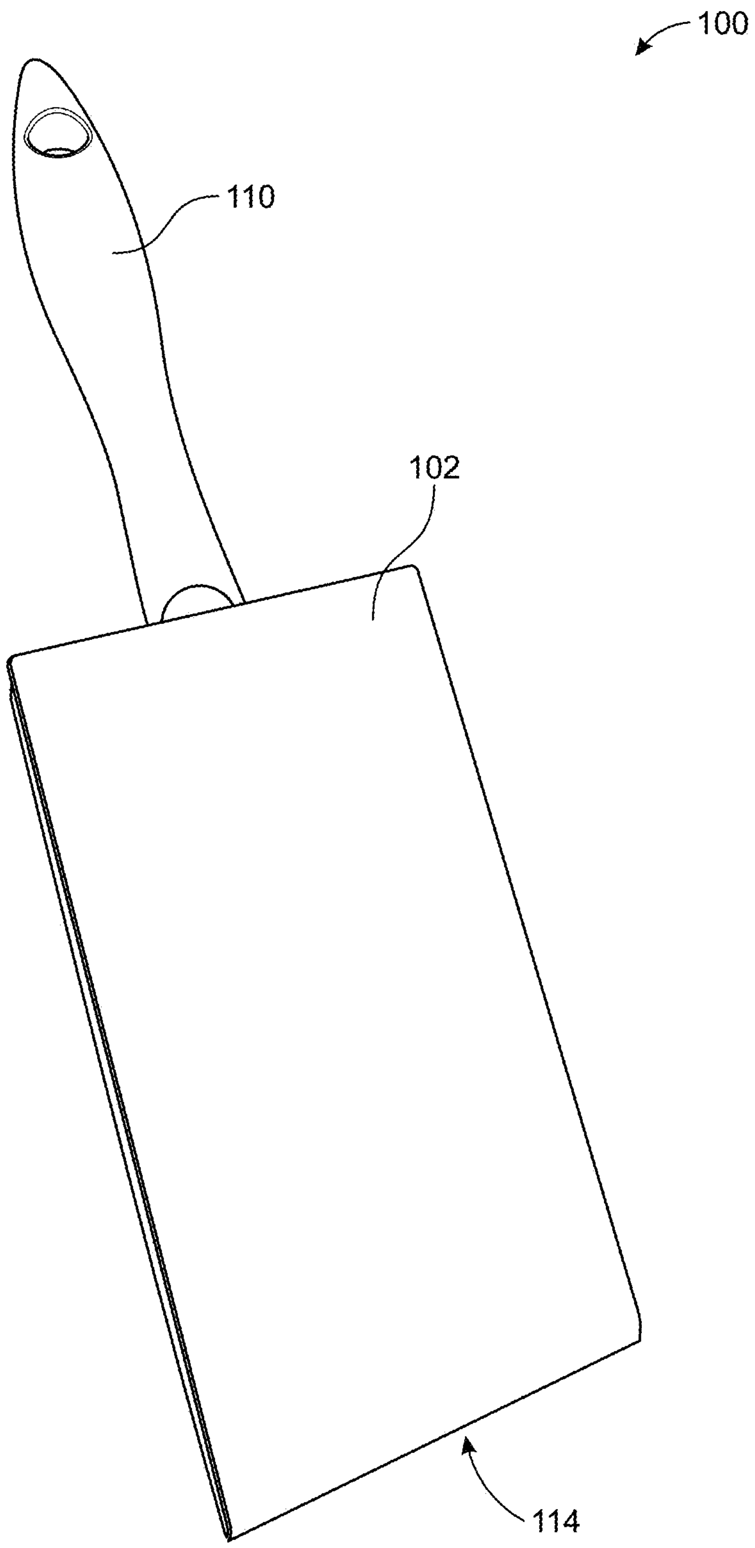
FIG. 1 is a top plan view of retail packaging including an angular brush and a box.

As a preliminary matter, it will readily be understood by one having ordinary skill in the relevant art ("Ordinary Artisan") that the invention has broad utility and application. Furthermore, any embodiment discussed and identified as being "preferred" is considered to be part of a best mode contemplated for carrying out the invention. Other embodiments also may be discussed for additional illustrative purposes in providing a full and enabling disclosure of the invention. Furthermore, an embodiment of the invention may incorporate only one or a plurality of the aspects of the invention disclosed herein; only one or a plurality of the features disclosed herein; or combination thereof. As such, many embodiments are implicitly disclosed herein and fall within the scope of what is regarded as the invention.

Accordingly, while the invention is described herein in detail in relation to one or more embodiments, it is to be understood that this disclosure is illustrative and exemplary of the invention and is made merely for the purposes of providing a full and enabling disclosure of the invention. The detailed disclosure herein of one or more embodiments is not intended, nor is to be construed, to limit the scope of patent protection afforded the invention in any claim of a patent issuing here from, which scope is to be defined by the claims and the equivalents thereof. It is not intended that the scope of patent protection afforded the invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the invention. Accordingly, it is intended that the scope of patent protection afforded the invention be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112 (f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once but not necessarily every time during performance of the claimed method.

Furthermore, it is important to note that, as used herein, "comprising" is open-ended insofar as that which follows such term is not exclusive. Additionally, "a" and "an" each generally denotes "at least one" but does not exclude a plurality unless the contextual use dictates otherwise. Thus, reference to "a picnic basket having an apple" is the same as "a picnic basket comprising an apple" and "a picnic basket including an apple", each of which identically describes "a picnic basket having at least one apple" as well as "a picnic basket having apples"; the picnic basket further may contain one or more other items beside an apple. In contrast, reference to "a picnic basket having a single apple" describes "a picnic basket having only one apple"; the picnic basket further may contain one or more other items beside an apple. In contrast. "a picnic basket consisting of an apple" has only a single item contained therein, i.e., one apple; the picnic basket contains no other item.

When used herein to join a list of items, "or" denotes "at least one of the items" but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers"; the picnic basket further may contain one or more other items beside cheese and crackers.

When used herein to join a list of items, "and" denotes "all of the items of the list". Thus, reference to "a picnic basket having cheese and crackers" describes "a picnic basket having cheese, wherein the picnic basket further has crackers", as well as describes "a picnic basket having crackers, wherein the picnic basket further has cheese"; the picnic basket further may contain one or more other items beside cheese and crackers.

The phrase "at least one" followed by a list of items joined by "and" denotes an item of the list but does not require every item of the list. Thus, "at least one of an apple and an orange" encompasses the following mutually exclusive scenarios: there is an apple but no orange; there is an orange but no apple; and there is both an apple and an orange. In these scenarios if there is an apple, there may be more than one apple, and if there is an orange, there may be more than one orange. Moreover, the phrase "one or more" followed by a list of items joined by "and" is the equivalent of "at least one" followed by the list of items joined by "and".

Referring now to the drawings, one or more preferred embodiments of the invention are next described. The following description of one or more preferred embodiments is merely exemplary in nature and is in no way intended to limit the invention, its implementations, or uses.

A preferred retail packaging 100 in accordance with one or more aspects and features of the invention is shown in FIGS. 1-11. The preferred retail packaging 100 comprises a box 102 and an angular paintbrush 104.

Figure 12:
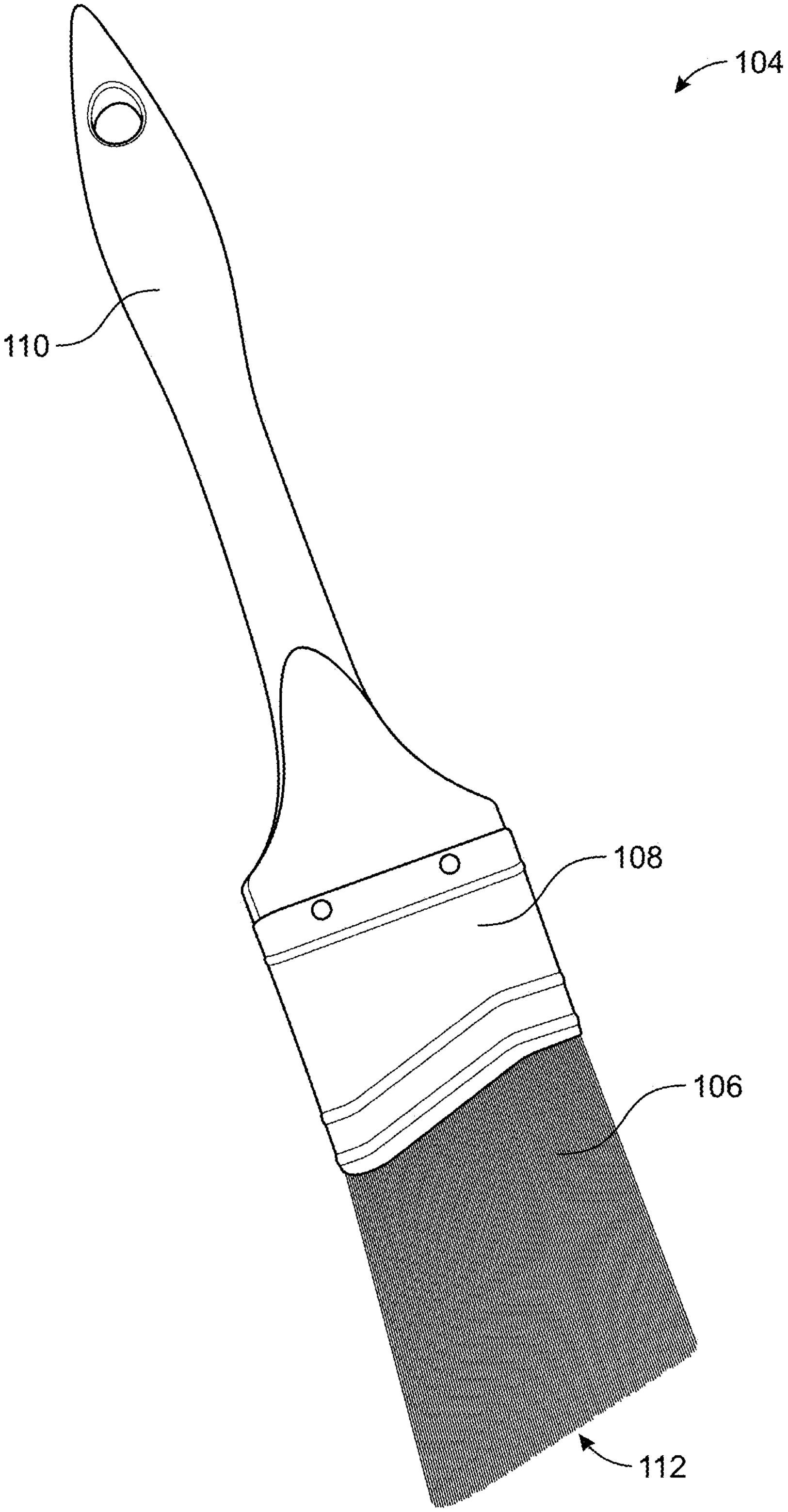
FIG. 12 is a top plan view of the angular brush of the retail packaging of FIG. 1.

The angular paintbrush 104 is shown by itself in FIG. 12. The paintbrush 104 preferably is an angular paintbrush used for painting trim. The paintbrush 104 comprises bristles 106 that are clamped or otherwise attached with a ferrule 108 to a handle 110. The bristles and ferrule may be referred to as a head of the brush, which head is contained within the box 102 of the retail packaging 100. The paintbrush is referred to as an "angular" paintbrush because the ends of the bristles 106 are cut at an angle such that the bristles form a slanted end of the paintbrush, as seen at 112 in FIG. 12. The angular paintbrush is designed for use in painting both molding and trim as well as in corners. Indeed, in the appendix a printed illustration on a face of a lid 103 of the box 102 even highlights the molding of a door for painting using the packaged paintbrush 104.

Figure 2:
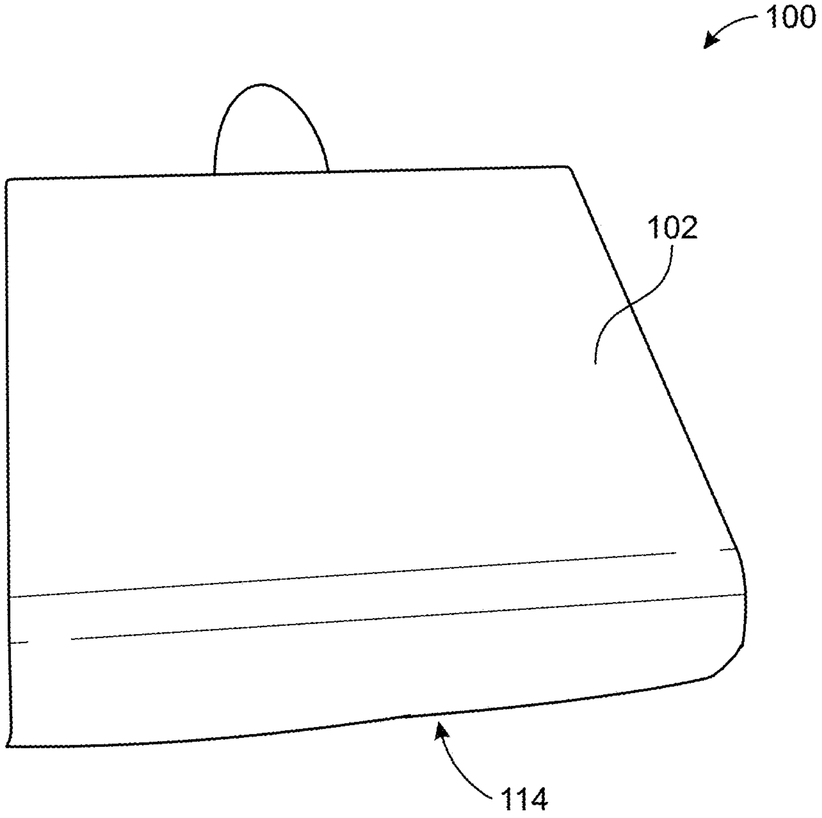
FIG. 2 is a perspective view of a nose of the box of the retail packaging of FIG. 1.
Figure 3:
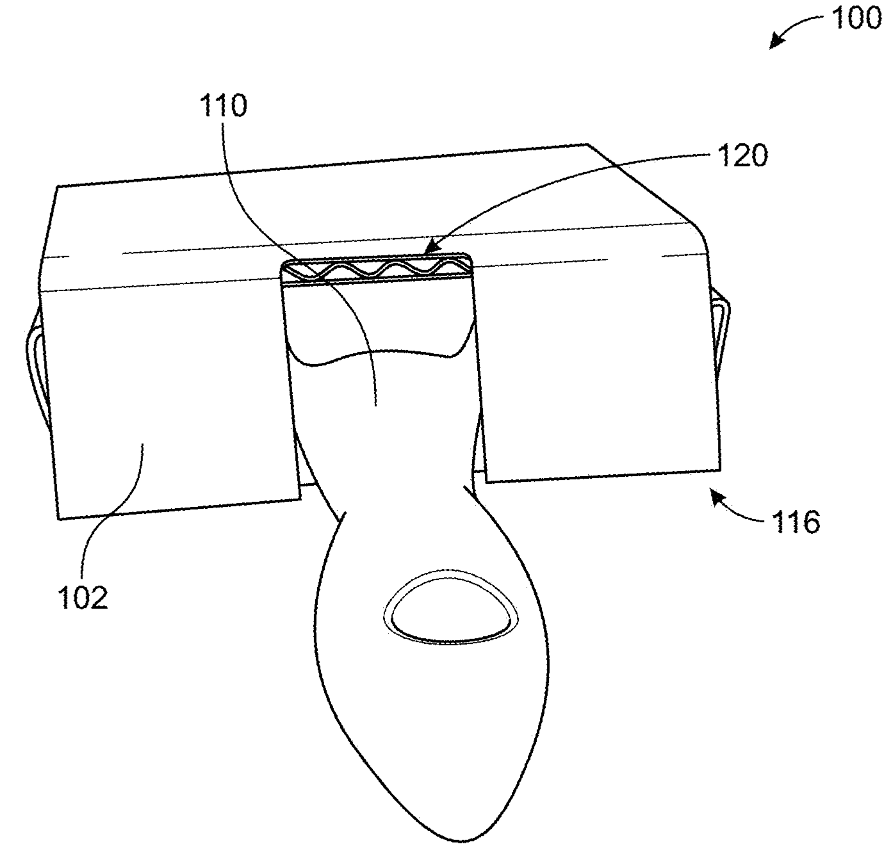
FIG. 3 is a perspective view of a rear of the box of the retail packaging of FIG. 1.
Figure 4:
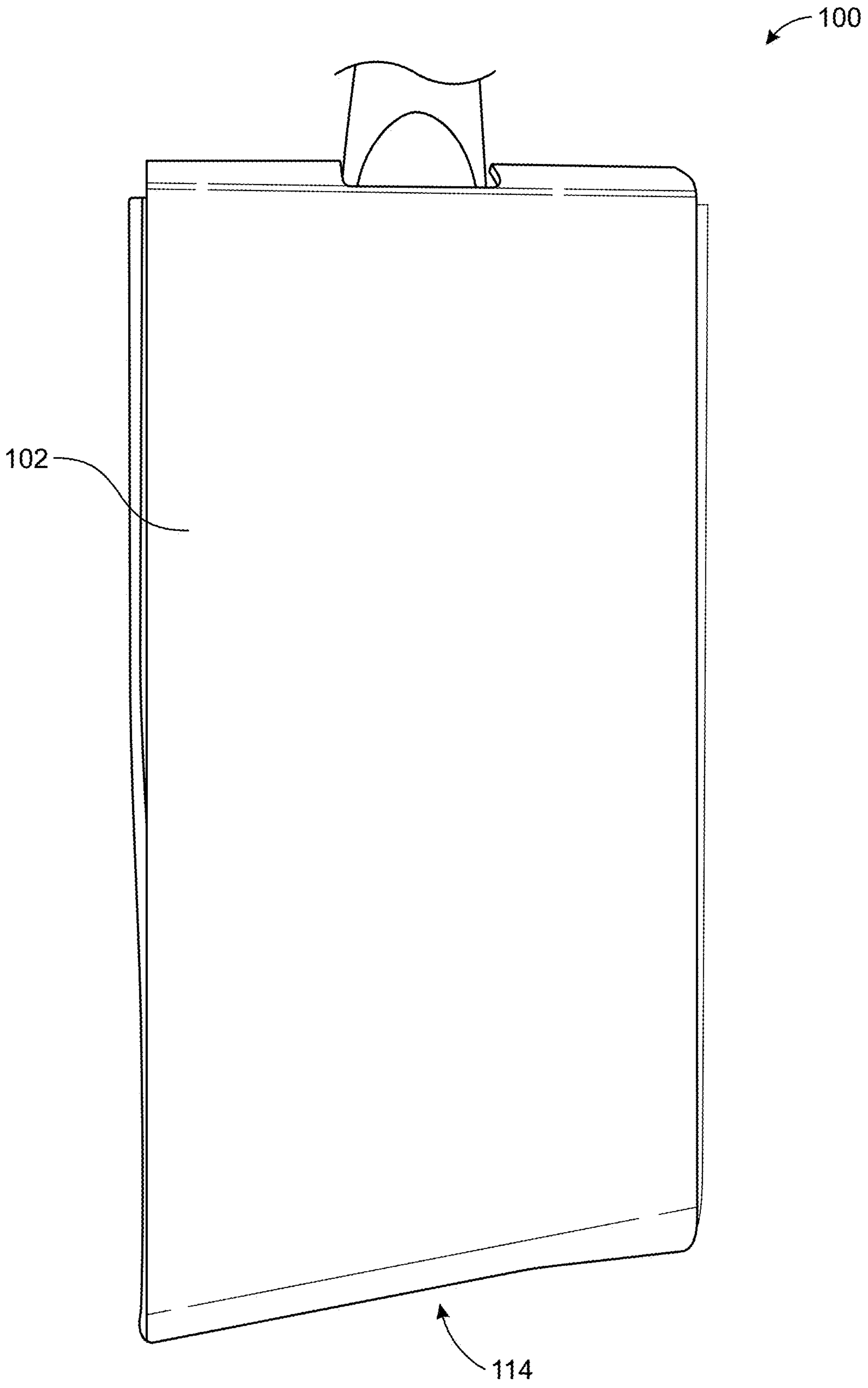
FIG. 4 is a top plan view of the box of the retail packaging of FIG. 1.
Figure 5:
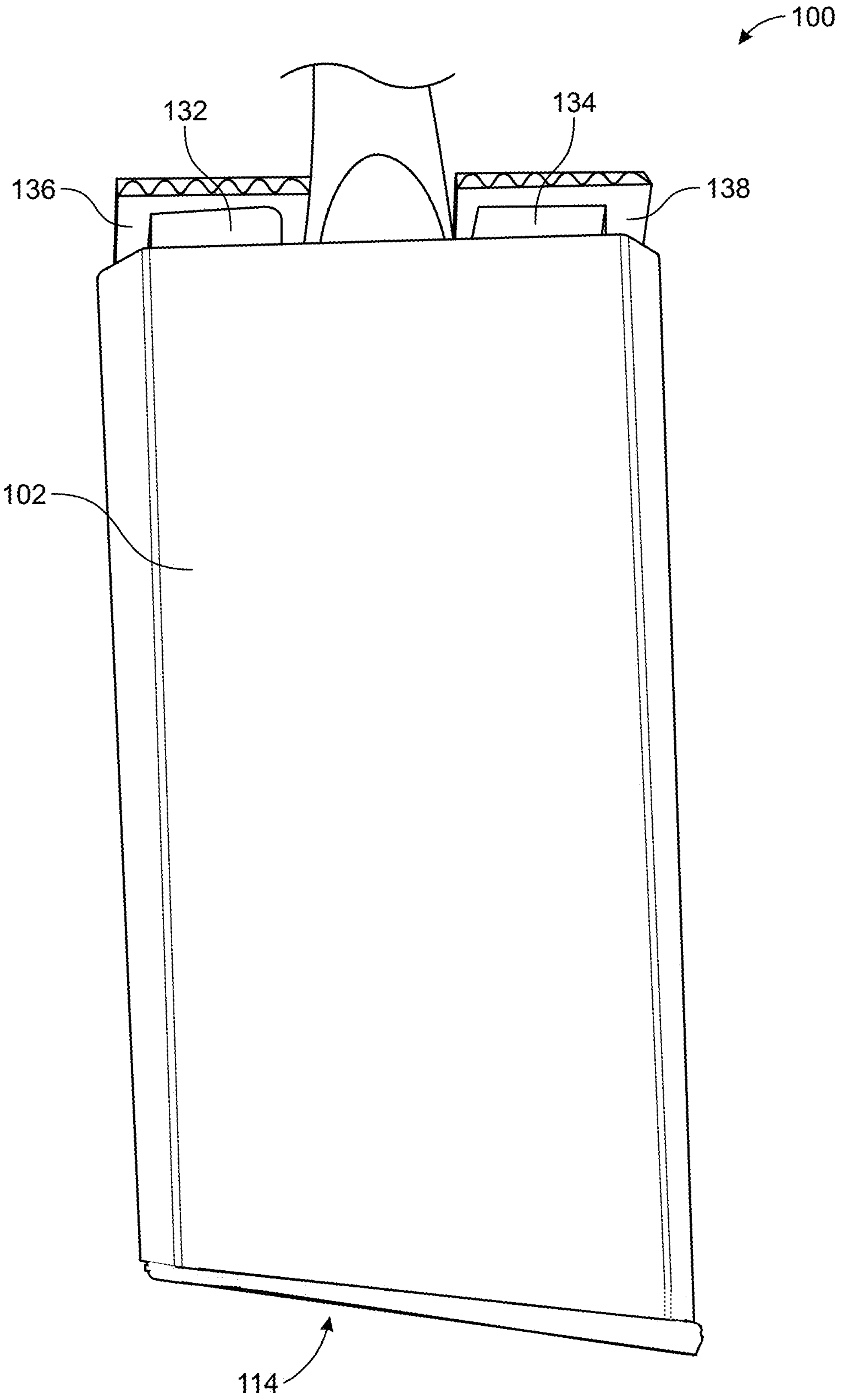
FIG. 5 is a bottom plan view of the box of the retail packaging of FIG. 1.
Figure 6:
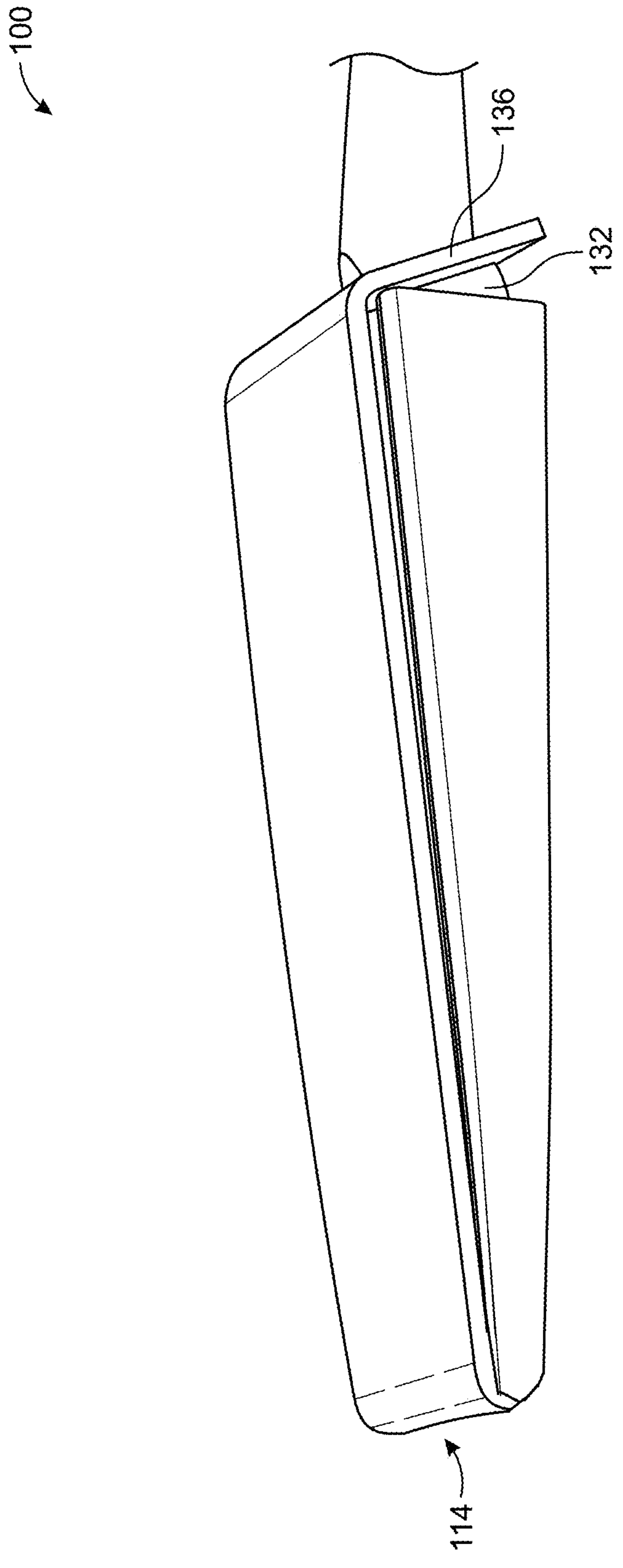
FIG. 6 is an elevational view of a right side of the box of the retail packaging of FIG. 1.
Figure 7:
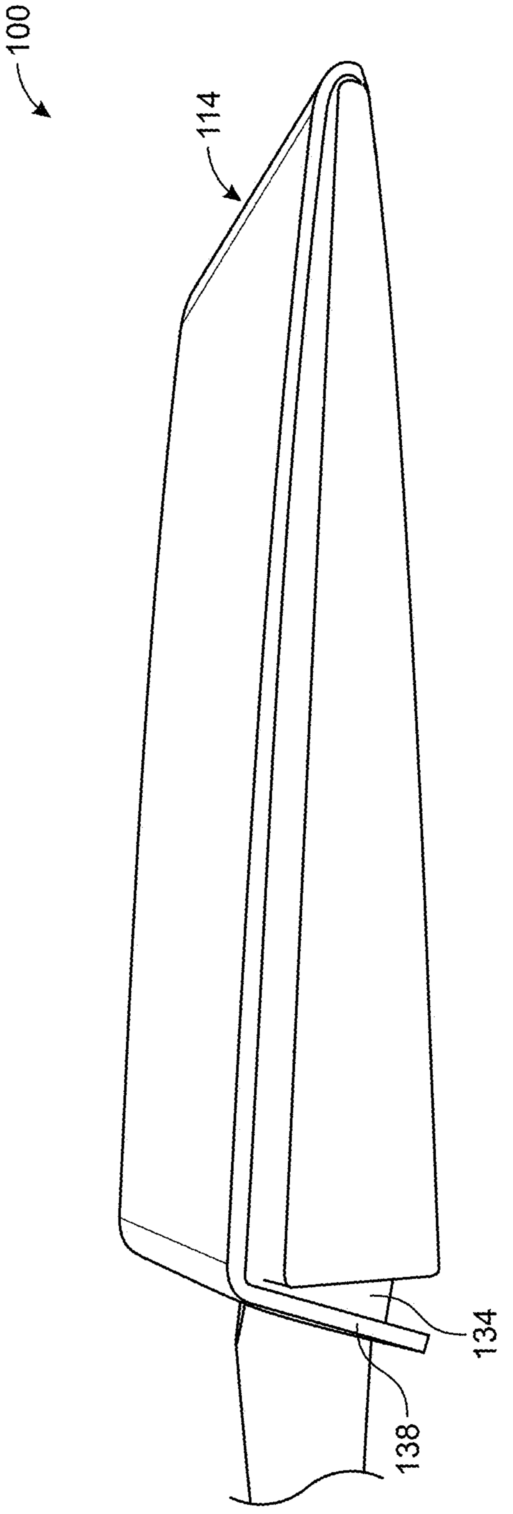
FIG. 7 is an elevational view of a left side of the box of the retail packaging of FIG. 1.
Figure 8:
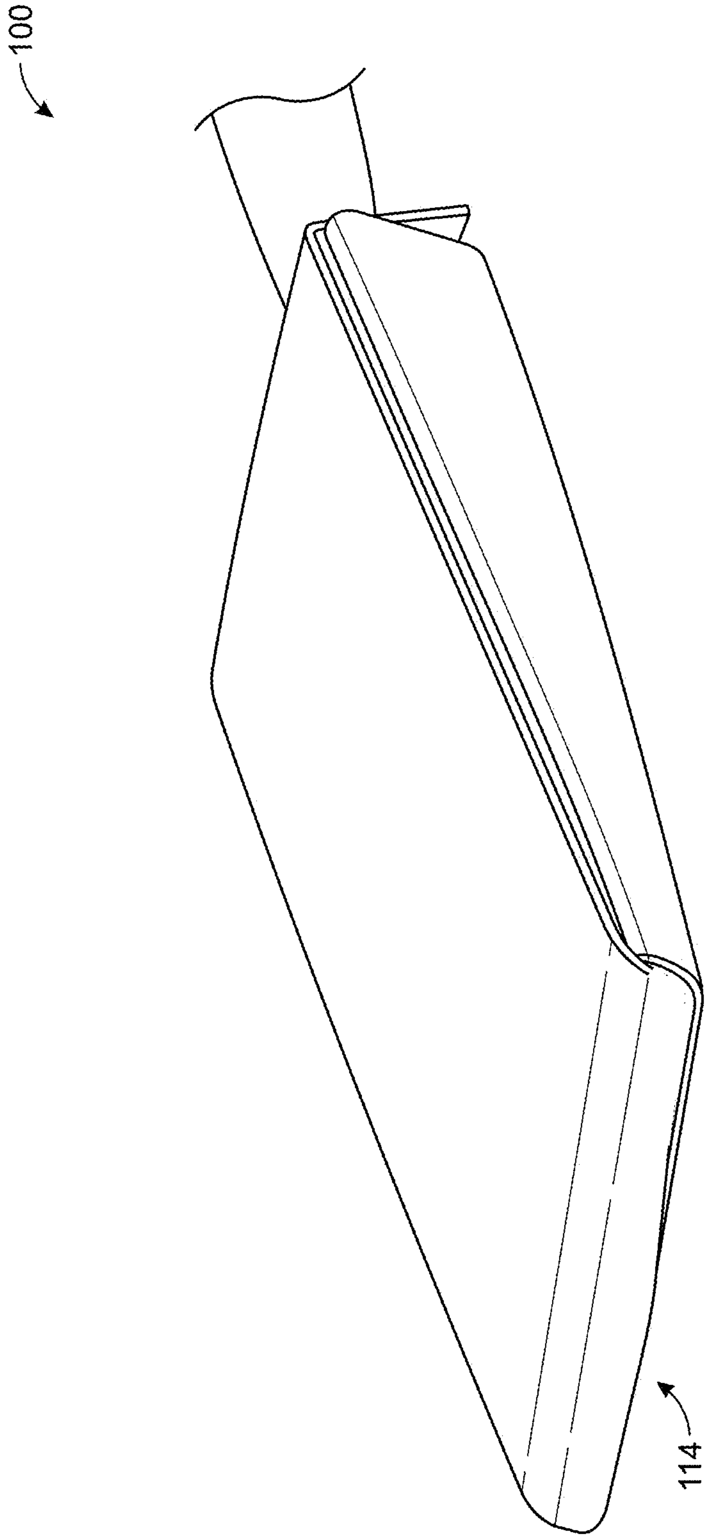
FIG. 8 is a perspective view of a right corner of the nose of the box of the retail packaging of FIG. 1.
Figure 9:
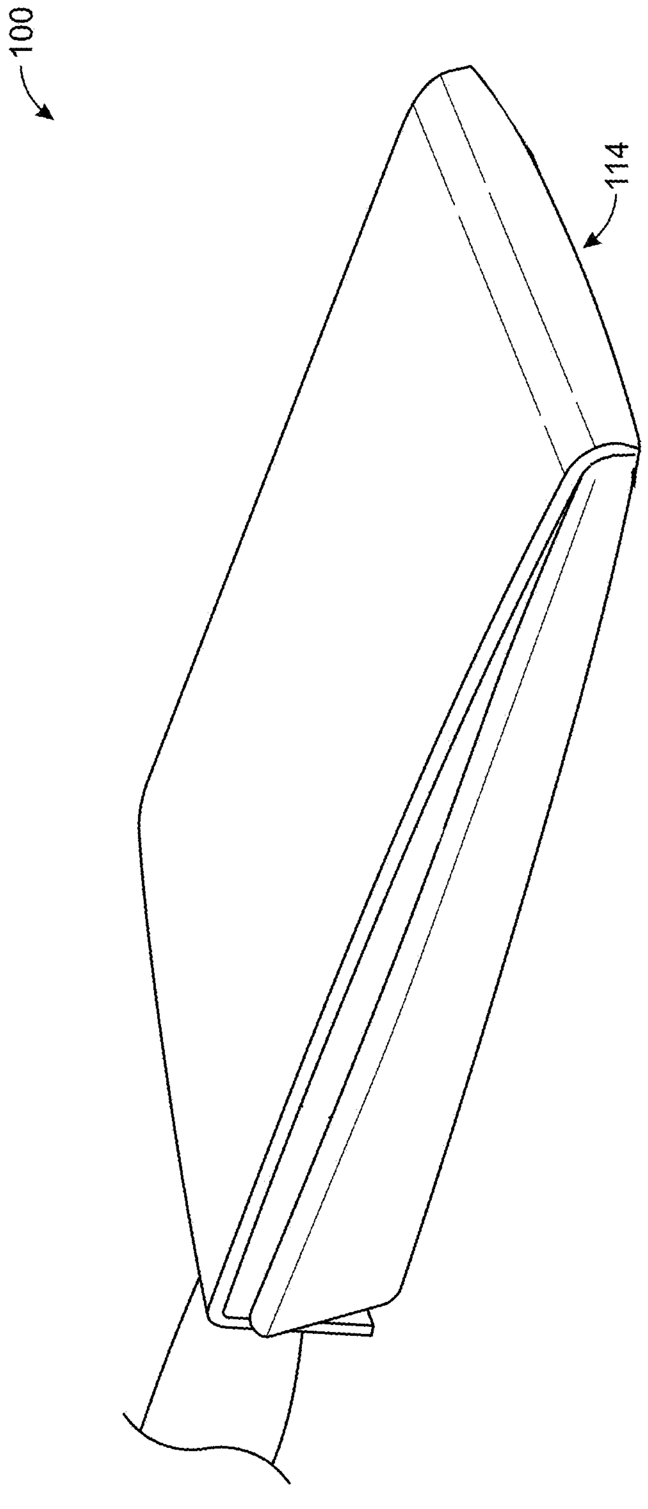
FIG. 9 is a perspective view of a left corner of the nose of the box of the retail packaging of FIG. 1.
Figure 10:
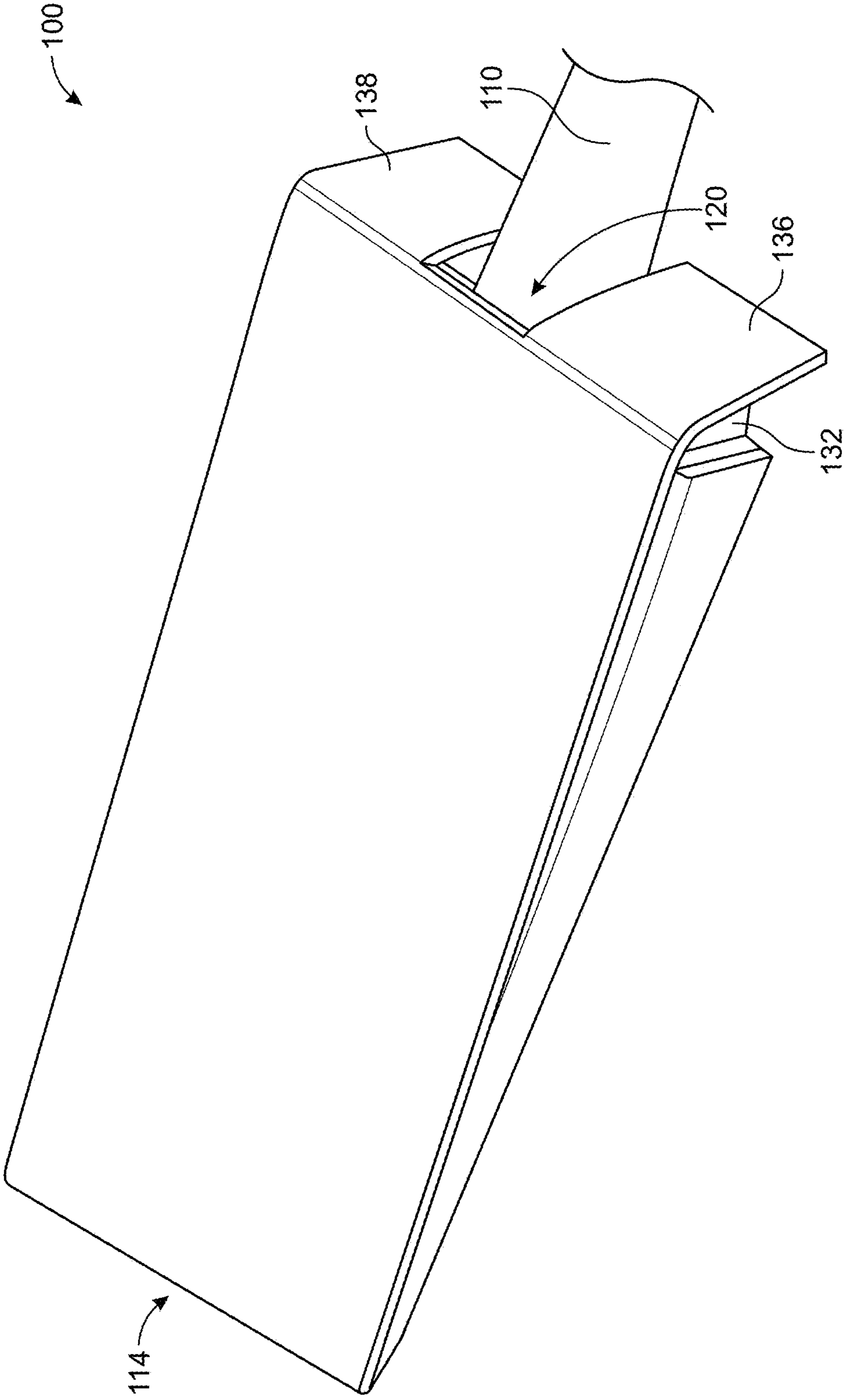
FIG. 10 is a perspective view of a right corner of the rear of the box of the retail packaging of FIG. 1.
Figure 11:
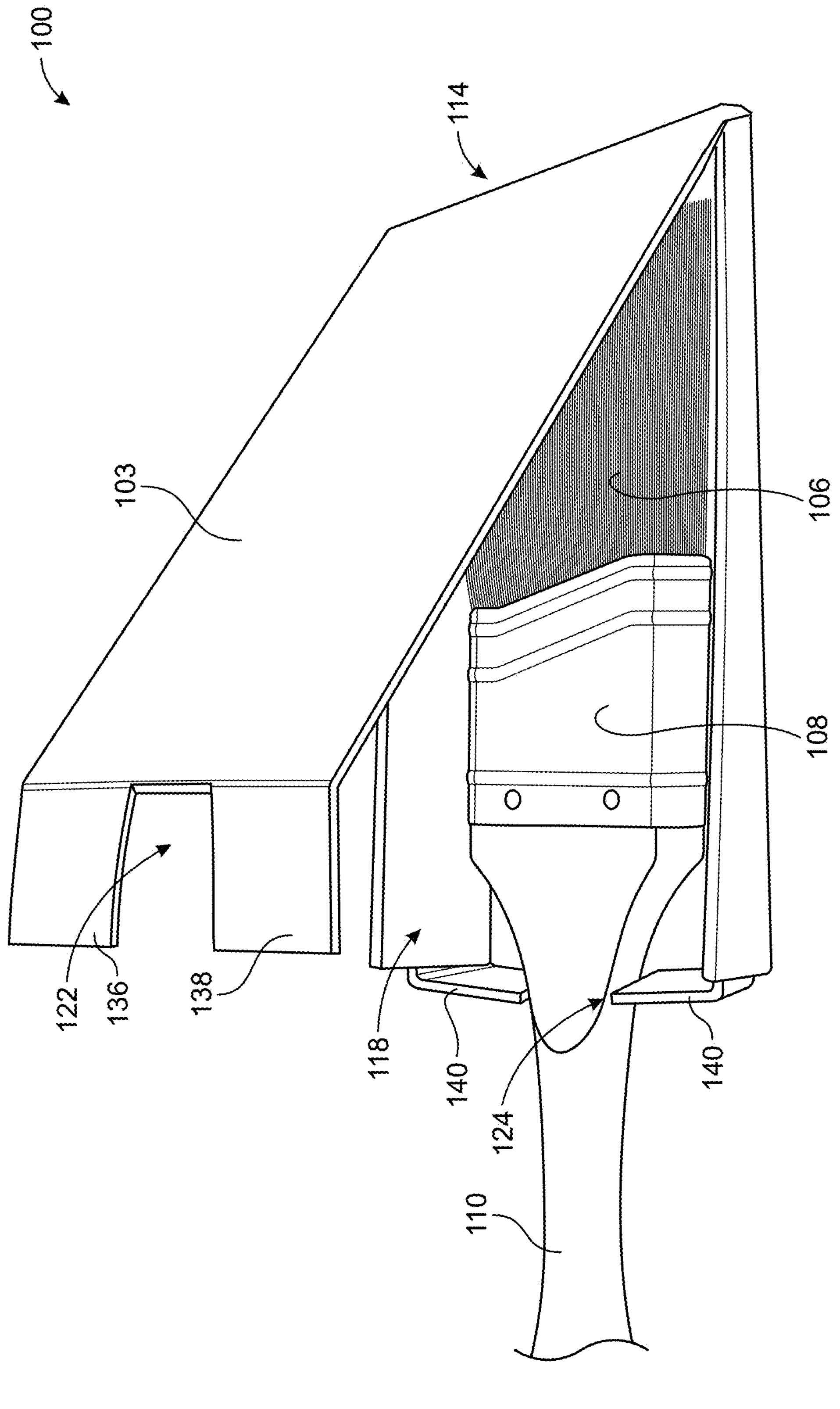
FIG. 11 is a perspective view of a left side of the box of the retail packaging of FIG. 1, wherein the box is opened to reveal the head of the angular brush, which head is contained within and protected by the box.

With reference now to FIGS. 1-11 and the retail packaging 100. FIG. 1 is a top plan view of the retail packaging 100; FIG. 2 is a perspective view of a nose 114 of the box 100 of the retail packaging 100; FIG. 3 is a perspective view of a rear 116 of the box 102 of the retail packaging 100; FIG. 4 is a top plan view of the box 102 of the retail packaging 100; FIG. 5 is a bottom plan view of the box 102 of the retail packaging 100; FIG. 6 is an elevational view of a right side of the box 102 of the retail packaging 100; FIG. 7 is an elevational view of a left side of the box 102 of the retail packaging 100; FIG. 8 is a perspective view of a right corner of the nose 114 of the box 102 of the retail packaging 100; FIG. 9 is a perspective view of a left corner of the nose 114 of the box 102 of the retail packaging 100; FIG. 10 is a perspective view of a right corner of the rear 116 of the box 102 of the retail packaging 100; and FIG. 11 is a perspective view of a left side of the box 102 of the retail packaging 100, wherein the box 102 is in an opened disposition.

With further reference to FIGS. 1-10 in contrast to FIG. 11, it will be appreciated that the ferrule 108 and bristles 106 are contained within an interior space 118 defined by the box 102 when in a closed disposition, as seen in FIGS. 1-10. The bristles 106 are thereby protected by the box 102. The handle 110 of the brush 104 extends through an opening 120 (perhaps best seen in FIG. 10) that is defined by generally U-shaped recesses 122, 124 (perhaps best seen in FIG. 11), which overlap each other when the box 102 is closed.

It will be appreciated from inspection of FIGS. 1-11 that the box 102 is structured such that the nose 114 of the box 102 corresponds to the slanted end defined by the angle of the cut bristles 106 whereby the bristles are protected by the box 102 while allowing the brush 104 to hold its shape. The bristles are neither impacted by nor bent in extent when within the interior space 118 of the box 102.

Preferably the box 102 is held in the closed disposition with fasteners. Preferred fasteners comprise hook-and-loop fasteners such as those known and sold under the Velcro brand, which include pairs of mating elements. One pair 132 of hook-and-loop elements is seen on one side of the handle 110, and another pair 134 of hook-and-loop elements is seen on the other side of the handle in FIG. 5. Each element of each pair is adhered to a respective surface of the box 102, with the fastening of the box 102 in the closed disposition being effected at the rear 116 of the box 102 as seen in FIG. 5. Specifically, a first element of each pair is attached to the interior surface of flaps 136, 138 and a second element of each pair is attached to an exterior surface 140 of the rear 116 of the box 102.

The box 102 preferably is made by folding a single piece of cardboard. Alternatively, the box 102 is made by connecting multiple pieces of cardboard together, such as by gluing, taping, or otherwise adhering the pieces together. The resulting construction preferably results in the lid 103 that is pivotable about a hinge at the nose 114 of the box 102, as seen in FIG. 11.

Figure 13:
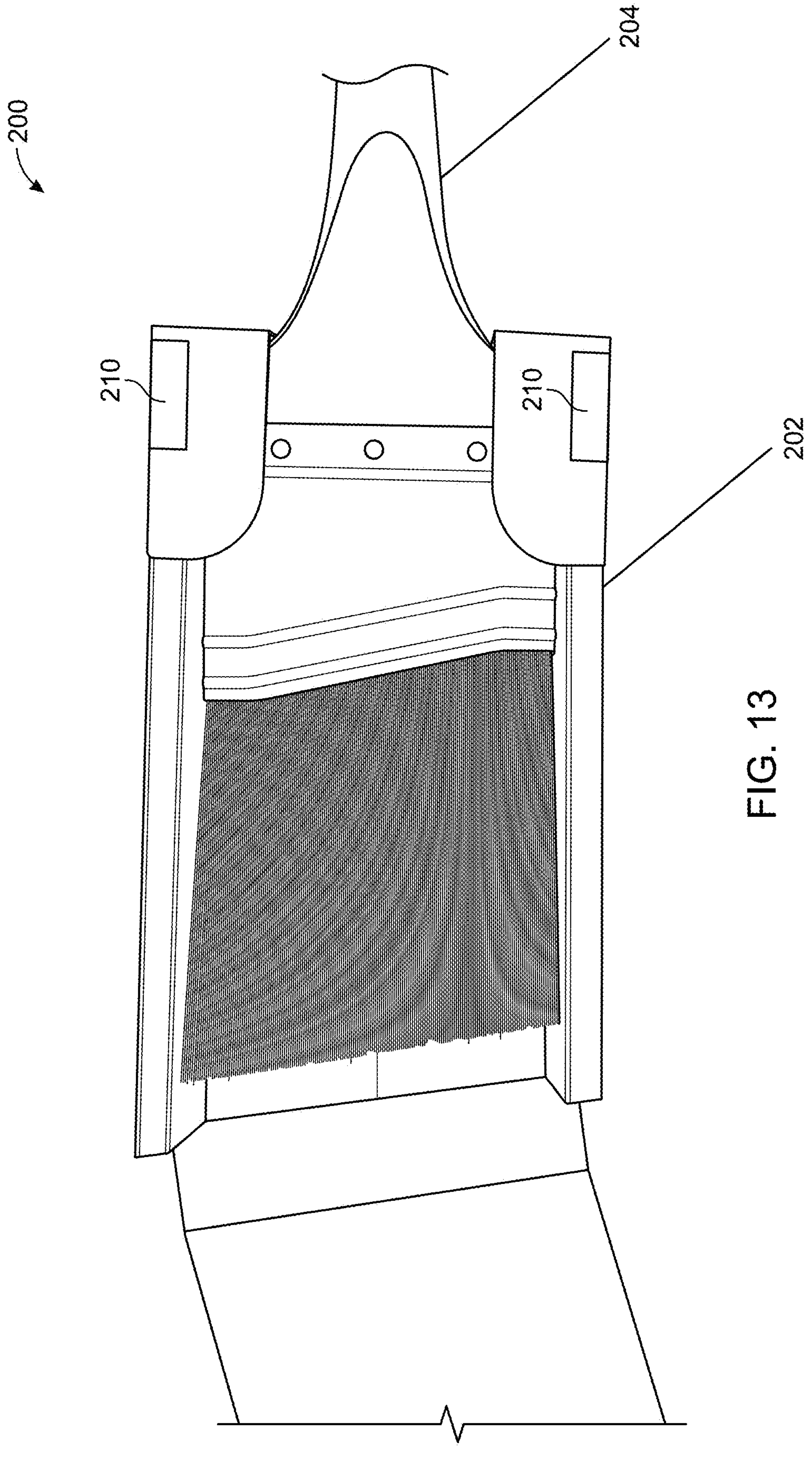
FIG. 13 is a top plan view of another retail packaging including an angular brush and a box, wherein the box is in an open condition.

Another preferred embodiment of retail packaging 200 in accordance with one or more aspects and features of the invention is illustrated in FIG. 13, which is a top view of the retail packaging 200 when in an open disposition. The retail packaging 200 comprises a box 202 and brush 204. Similar to the foregoing retail packaging 100, preferably the box 202 is held in the closed disposition with two pairs of fasteners; two fasteners of respective pairs are seen at 210 located on and adhered to flange panels. The flange panels additionally serve to retain the brush head within the box (which is seen in the supplemental appendix).

Figure 14:
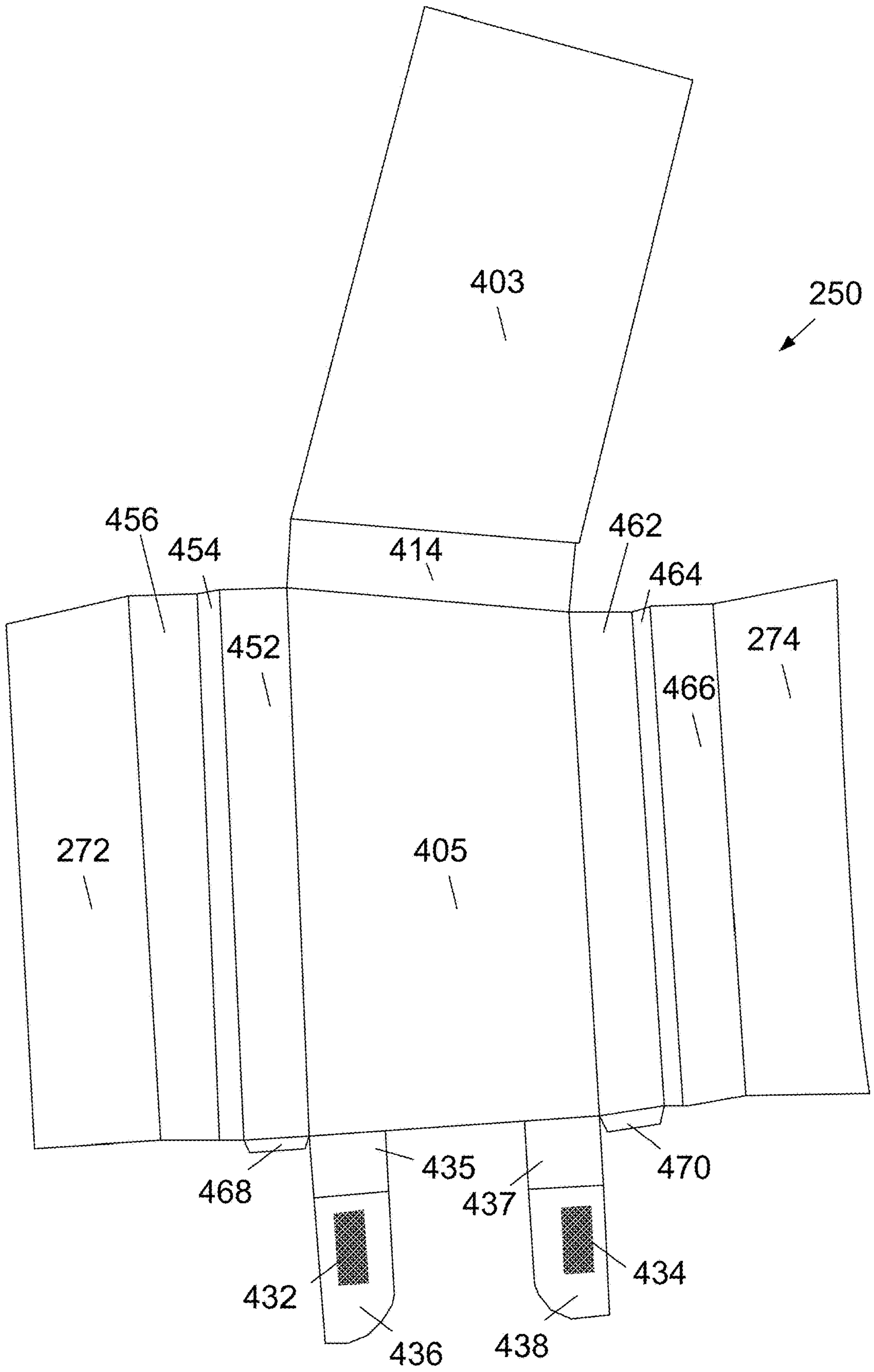
FIG. 14 is a top view of a blank comprising a single sheet of cardboard, wherein fold lines are defined therein that form panels, and wherein folding of the blank preferably forms the box of the retail packaging of FIG. 13.
Figure 15:
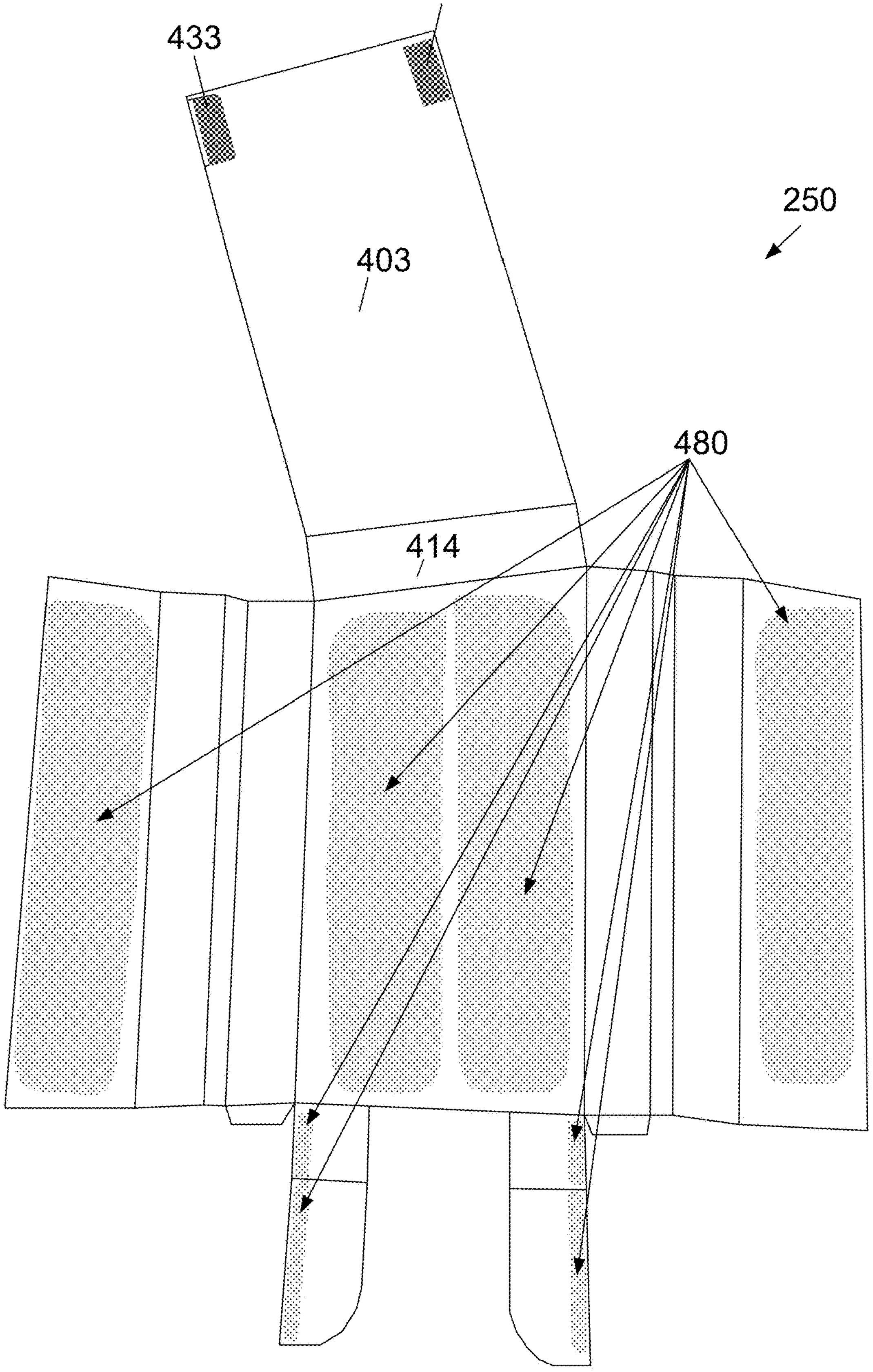
FIG. 15 is a bottom view of the blank of FIG. 14.

The box 202 of the retail packaging 200 preferably is formed by folding a single sheet of cardboard along fold lines that are defined in the sheet. The fold lines defined in the sheet preferably form a plurality of panels of the box 202. A top view of the sheet with fold lines and panels defined thereby. i.e., blank 250, is seen in FIG. 14, and a bottom view of the blank 250 is seen in FIG. 15. With reference to FIG. 14, these panels comprise a lid panel 403; a nose panel 414; a bottom panel 405; a first flap comprising flap panel 435 and flap panel 436; a second flap comprising flap panel 437 and flap panel 438; a first side wall comprising side wall panels 452, 454, 456; a second side wall comprising side wall panels 462, 464, 466; end panels 468 and 470; and attachment panels 272, 274. With reference to FIGS. 14 and 15, the box 202 further comprises a pair of hook-and-loop fastener elements 431 and 432; and another pair of hook-and-loop fastener elements 433 and 434. Furthermore, FIG. 15 reveals panel surfaces 480 that are glued together. The indicated glued panel surfaces 480 are located on surfaces of attachment panels 272, 274; bottom panel 405; and flap panels 435, 436, 437, 438. Additional views of the retail packaging 200 are set forth in the supplemental appendix attached hereto, which is incorporated by reference herein.

Based on the foregoing description, it will be readily understood by those persons skilled in the art that the present invention has broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and equivalents.

What is claimed is:

1. Packaging, comprising (a) an angular brush with bristles of the brush forming a slanted end; and (b) a box protecting the angular brush, the box being formed by a folded sheet of material having panels defined by fold lines, the box comprising:

(i) a lid panel;

(ii) a bottom panel;

(iii) a first side wall extending along one side of the bottom panel, the first side wall connected to the bottom panel along a fold line, the first side wall comprising three adjacent panels each connected to another along respective fold lines to define the first side wall;

(iv) a first attachment panel adhered in covering relation onto the bottom panel and connected to one of the three adjacent panels of the first side wall along a fold line;

(v) a second side wall extending along a second side of the bottom panel opposite the first side, the second side wall connected to the bottom panel along a fold line, the second side wall comprising three adjacent panels each connected to another along respective fold lines to define the second side wall; and (vi) a second attachment panel adhered in covering relation onto the bottom panel and connected to one of the three adjacent panels of the second side wall along a fold line;

(c) wherein an interior space of the box that is bounded by the first and second attachment panels and the lid panel encloses the bristles of the angular brush; and (d) wherein the folded sheet of material defines a nose having a shape corresponding to the slanted end of the bristles of the angular brush for accommodating the bristles of the angular brush without bending the bristles.

2. The packaging of claim 1, wherein the folded sheet of material defines overlapping recesses that define an opening through which a handle of the brush extends exteriorly from the interior space.

3. The packaging of claim 1, wherein the lid panel is movable between a closed position and an opened position.

4. The packaging of claim 3, further comprising hook-and-loop fasteners for securing the lid in the closed position.

5. A method for protecting an angular brush with bristles of the brush forming a slanted end, comprising (a) folding a sheet of material to form a box, the box having panels defined by fold lines, the box comprising:

(i) a lid panel;

(ii) a bottom panel;

(iii) a first side wall extending along one side of the bottom panel, the first side wall connected to the bottom panel along a fold line, the first side wall comprising three adjacent panels each connected to another along respective fold lines to define the first side wall;

(iv) a first attachment panel adhered in covering relation onto the bottom panel and connected to one of the three adjacent panels of the first side wall along a fold line;

(v) a second side wall extending along a second side of the bottom panel opposite the first side, the second side wall connected to the bottom panel along a fold line, the second side wall comprising three adjacent panels each connected to another along respective fold lines to define the second side wall; and (vi) a second attachment panel adhered in covering relation onto the bottom panel and connected to one of the three adjacent panels of the second side wall along a fold line; and (b) placing the angular brush inside an interior space of the box that is bounded by the first and second attachment panels and the lid panel of the box such that bristles of the angular brush are contained within the interior space of the box, wherein the folded sheet of material defines a nose having a shape corresponding to the slanted end of the bristles of the angular brush for accommodating the bristles of the angular brush without bending the bristles.

6. The method of claim 5, wherein the folded sheet of material defines overlapping recesses that define an opening through which a handle of the brush extends exteriorly from the interior space.

7. The method of claim 5, further comprising moving the lid panel between an open position and a closed opened position.

8. The method of claim 7, further comprising removing the angular brush from the interior space when the lid panel is in the open position.

9. The method of claim 7, further comprising inserting the angular brush into the interior space when the lid panel is in the open position.

10. The method of claim 9, further comprising securing the lid panel in the closed position using hook-and-loop fasteners.

11. The method of claim 10, wherein the hook-and-loop fasteners are located on a side of the box when the lid panel is in the closed position.

12. The method of claim 11, wherein the folded sheet of material defines overlapping recesses that define an opening through which a handle of the brush extends exteriorly from the interior space, and wherein the hook-and-loop fasteners are located on opposite lateral sides of the opening through which the handle of the brush extends exteriorly from the interior space.

* * * * *